United States Patent
Kawamoto et al.

(10) Patent No.: US 8,857,549 B2
(45) Date of Patent: Oct. 14, 2014

(54) CONTROL VALVE ATTACHMENT STRUCTURE FOR CONSTRUCTION MACHINE

(75) Inventors: Junya Kawamoto, Tsuchiura (JP); Kosuke Moriguchi, Tsuchiura (JP); Katsuhiro Sasaki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/001,095

(22) PCT Filed: Feb. 10, 2012

(86) PCT No.: PCT/JP2012/053148
§ 371 (c)(1),
(2), (4) Date: Aug. 22, 2013

(87) PCT Pub. No.: WO2012/114912
PCT Pub. Date: Aug. 30, 2012

(65) Prior Publication Data
US 2013/0330159 A1    Dec. 12, 2013

(30) Foreign Application Priority Data
Feb. 23, 2011   (JP) ................................ 2011-037353

(51) Int. Cl.
| | |
|---|---|
| B62D 33/06 | (2006.01) |
| E02F 3/32 | (2006.01) |
| E02F 3/30 | (2006.01) |
| E02F 9/08 | (2006.01) |
| E02F 9/22 | (2006.01) |
| F16M 13/02 | (2006.01) |

(52) U.S. Cl.
CPC ............... *E02F 9/0875* (2013.01); *E02F 3/325* (2013.01); *E02F 3/30* (2013.01); *E02F 9/2278* (2013.01); *E02F 9/2275* (2013.01); *F16M 13/02* (2013.01)
USPC .................. 180/89.12; 180/333; 180/334

(58) Field of Classification Search
USPC .............. 180/89.12, 53.4, 331, 332, 333, 334
See application file for complete search history.

(56) References Cited

U.S. PATENT DOCUMENTS 3,989,117 A * 11/1976 Hill ............................... 180/305
4,203,414 A *  5/1980 McClain .................... 125/23.01

(Continued)

FOREIGN PATENT DOCUMENTS

| JP | 2000-291065 A | 10/2000 |
|---|---|---|
| JP | 2003-129520 A | 5/2003 |
| JP | 2005-336735 A | 12/2005 |

OTHER PUBLICATIONS

International Search Report dated May 15, 2012 with English translation (Three (3) pages).

*Primary Examiner* — Toan To
(74) *Attorney, Agent, or Firm* — Crowell & Moring LLP

(57) ABSTRACT

A mount structure for a control valve unit is provided to permit selective mounting of a small first control valve unit or a large second control valve unit on bodies of construction machines of different models the same family without incurring an increase in the number of kinds of parts or components. The control valve unit may be a small first control valve unit or a large second control valve unit. The mount structure is constructed such that upon mounting the first or second control valve unit on a bracket on which the first or second control valve unit may be selectively mounted, a barycentric position of the bracket with the first control valve unit mounted thereon and a barycentric position of the bracket with the second control valve unit mounted thereon are located on an imaginary line connecting paired hanging-member fixing portions of the bracket.

8 Claims, 8 Drawing Sheets

(56) References Cited

U.S. PATENT DOCUMENTS

| | | | |
|---|---|---|---|
| 4,828,452 A * | 5/1989 | Bolitho | 414/718 |
| 4,852,680 A * | 8/1989 | Brown et al. | 180/287 |
| 5,547,039 A * | 8/1996 | Berger et al. | 180/287 |
| 5,944,204 A * | 8/1999 | Vollmer | 212/261 |
| 7,201,106 B2 * | 4/2007 | Whiston et al. | 105/72.2 |
| 8,621,855 B2 * | 1/2014 | Meyeres et al. | 60/327 |
| 2005/0045245 A1 * | 3/2005 | Kurelek | 144/4.1 |
| 2008/0091309 A1 * | 4/2008 | Walker | 701/1 |
| 2008/0210212 A1 * | 9/2008 | Baratta | 125/15 |
| 2012/0328395 A1 * | 12/2012 | Jacobsen et al. | 414/1 |

* cited by examiner

FIG. 6A  FIG. 6B
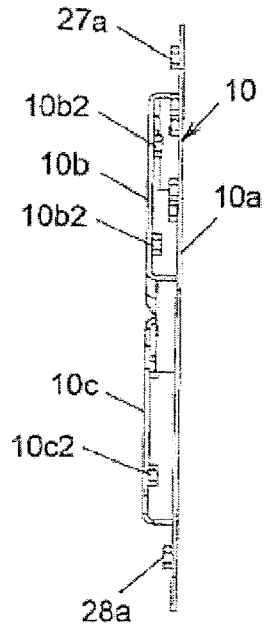
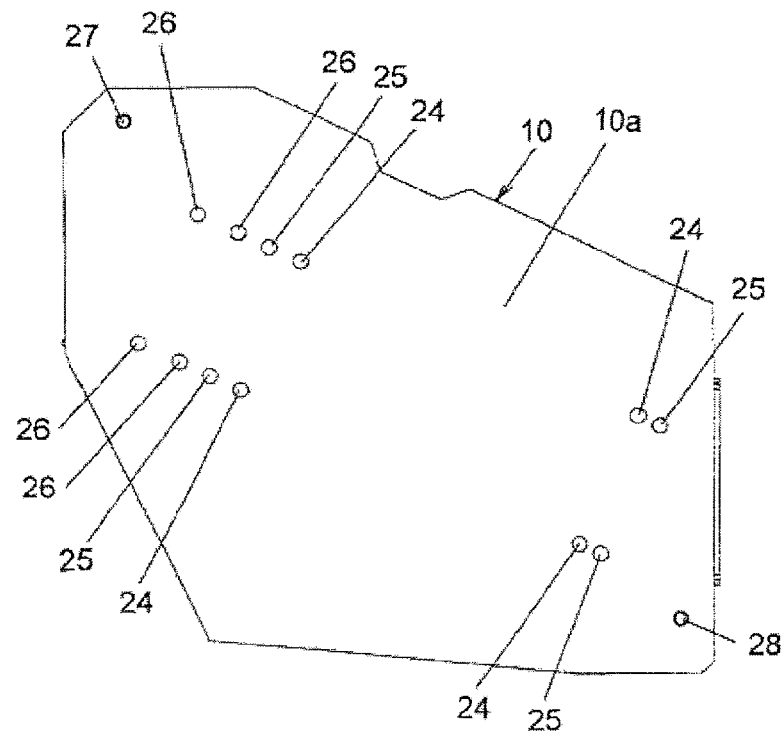
FIG. 6C
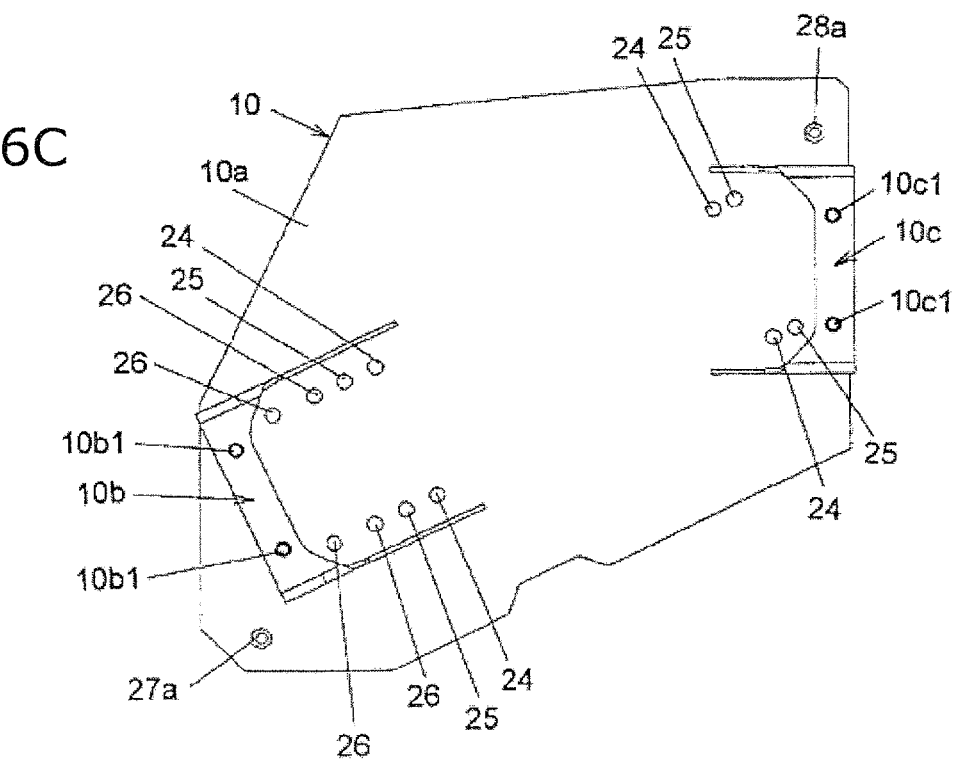

CONTROL VALVE ATTACHMENT STRUCTURE FOR CONSTRUCTION MACHINE

TECHNICAL FIELD

This invention relates to a mount structure for a control valve unit on a construction machine such as a compact excavator. The control valve unit is comprised of plural directional control valves arranged side by side for controlling individual hydraulic actuators that drive working equipment and the like. The mount structure is useful in mounting the control valve unit on a body via a bracket.

BACKGROUND ART

As a conventional technology of this type, there is one disclosed in Patent Document 1. In this Patent Document 1, amount structure for a control valve unit on a construction machine such as a hydraulic excavator is disclosed. According to this conventional technology, a unitary assembly is fabricated beforehand by mounting the control valve unit on a bracket and connecting hydraulic pipes at one ends thereof to the control valve unit. The bracket included in the unitary assembly is fixed on a swing frame by bolts to mount the control valve unit on an upper structure

PRIOR ART DOCUMENT

Patent Document

Patent Document 1: JP-A-2000-291065

DISCLOSURE OF THE INVENTION

Problem to be Solved by the Invention

Concerning construction machines, for example, compact excavators even when they are of the same family as conventional ones, it is nowadays considered to install, in view of energy saving, a small-output engine instead of an engine of a type installed to date. In this case, it is desired to maintain an equal pump output as the conventional pump output despite the installation of the small-output engine. For the maintenance of such an equal pump output as the conventional pump output even when such a small-output engine is installed, it may hence be contemplated to set the pipe diameter larger to reduce the pressure loss in a piping system more than before and also to make larger the control valve unit to be connected to piping. Described specifically, with a view to providing compact excavators of different models in the same family with equal pump output, it may be contemplated to arrange the same control valve unit (hereinafter called "the first control valve unit") as before when an engine of equal power output as before is installed but to arrange a control valve unit (hereinafter called "the second control valve unit") larger than the first control valve unit when a small-output engine is installed.

Now assume that compact excavators of different models in the same family are to be provided with the small first control valve unit and the large second control valve unit, respectively. It is then necessary to provide the first control valve unit and second control valve unit with different brackets of different shapes and dimensions, respectively, when the above-mentioned contemplation of the conventional technology is adopted. Problems, therefore, arise in that the number of kinds of parts or components increases and the manufacturing cost becomes high, both compared with before, when the manufacture of compact excavators of different models in the same family is taken into consideration.

When the above-mentioned contemplation of the conventional technology is adopted, the barycentric position of the bracket with the small first control valve unit mounted thereon and the barycentric position of the bracket with the large second control valve unit mounted thereon differ from each other, and as a result, a need arises for both of hanging members for hanging up and down the bracket with the first control valve unit mounted thereon and other hanging members for hanging up and down the bracket with the second control valve unit mounted thereon. As a consequence, when the manufacture of compact excavators of different models in the same family is taken into consideration, the workability of the mounting work of control valve units is lowered than before. Further, an increased number of kinds of hanging members have to be provided, thereby raising a problem that the manufacturing cost becomes higher than before.

With the above-mentioned actual situation of the conventional technology in view, the present invention has as an object thereof the provision of a mount structure for a control valve unit on a construction machine, which makes it possible to selectively mount a small first control valve unit or a large second control valve unit on the body of each of construction machines of different models in the same family without incurring an increase in the number of kinds of parts or components.

Means for Solving the Problem

To achieve this object, the present invent ion provides a mount structure for a control valve unit on a construction machine having working equipment, a body with the working equipment attached thereto, a hydraulic actuator for driving the working equipment and a hydraulic actuator for driving the body, and the control valve unit comprised of plural directional control valves arranged side by side for controlling the hydraulic actuators, respectively, said mount structure having a bracket for mounting the control valve unit thereon and being to be fixed on the body, wherein the control valve unit comprises a first control valve unit, and a second control valve unit having plural directional control valves set at a greater arrangement pitch than an arrangement pitch of plural directional control valves included in the first control valve unit and formed larger than the first control valve unit, the bracket has a pair of hanging-member fixing portions and is used to mount thereon only one of the first control valve unit and second control valve unit although the first control valve unit and the second control valve unit can each be mounted on the bracket, and upon mounting the one of the first control valve unit and second control valve unit on the bracket, the one of the first control valve unit and second control valve unit is mounted on the bracket such that a barycentric position of the bracket with the first control valve unit mounted thereon and a barycentric position of the bracket with the second control valve unit mounted thereon are located on an imaginary line that connects the paired hanging-member fixing portions with each other.

According to the present invention constructed as described above, the small first control valve unit and the large second control valve unit can each be mounted on the bracket. When the manufacture of construction machines of different models in the same family is taken into consideration, it is, therefore, possible to realize the use of common brackets for mounting both the first control valve unit and the second control valve unit. Accordingly, the use of these common brackets can selectively mount the first control valve unit or the second control valve unit on the bodies of such construction machines without incurring an increase in the number of kinds of parts or components.

In the present invention, the barycentric position of the bracket with the small first control valve unit mounted thereon and the barycentric position of the bracket with the large second control valve unit mounted thereon are located on the imaginary line that connects the paired hanging-member fixing portions with which the bracket is provided. When the manufacture of construction machines of different models in the same family is taken into consideration, it is, therefore, possible to realize the use of common hanging members for hanging up and down such brackets with such control valve units mounted thereon, respectively. Accordingly, the use of these common hanging members can selectively mount the first control valve unit or the second control valve unit on the body of each of such construction machines without incurring an increase in the number of kinds of parts or components.

In the above-described invention, the one of the first control valve unit and second control valve unit may be mounted on the bracket such that the barycentric position of the bracket with the first control valve unit mounted thereon and the barycentric position of the bracket with the second control valve unit mounted thereon coincide with each other.

In the present invention constructed as described above, the barycentric position of the bracket with the first control valve unit mounted thereon and the barycentric position of the bracket with the second control valve unit mounted thereon coincide with each other. Even when the second control valve unit is mounted on the bracket, it is, therefore, possible to stably hang up the bracket as in the case that the first control valve unit is mounted on the bracket.

In the above-described invention, the bracket may be provided with a flat plate part having bolt holes in which bolts for mounting the first control valve unit are to be inserted and bolt holes in which bolts for mounting the second control valve unit are to be inserted, and also with mount parts formed extending from the flat plate part and having bolt holes in which bolts for fixing the bracket on the body are to be inserted.

According to the present invention constructed as described above, upon mounting either the first control valve unit or the second control valve unit on the bracket, the relevant control valve unit can be firmly fixed on the bracket by inserting the bolts in the corresponding bolt holes arranged through the flat plate part. Further, the mount parts, in other words, the bracket can be firmly fixed on the body by inserting the bolts in the bolt holes arranged through the mount parts formed extending from the flat plate part.

In the above-described invention, the mount structure may be further provided with hydraulic hoses for connecting the one of the first control valve unit and second control valve unit and the hydraulic actuators with each other, and also with a control valve block fabricated before the bracket is fixed on the body and integrally including the bracket, the one control valve unit mounted on the bracket, and the hydraulic hoses connected at one ends thereof to the one control valve unit and not connected at opposite ends thereof to the hydraulic actuators, and the mount parts of the bracket included in the control valve block may be fixed on the body.

In the present invention constructed as described above, the control valve block—which integrally includes the prefabricated bracket, the one of the first control valve unit and second control valve unit, and the hydraulic hoses connected at the one ends thereof to the one control valve unit and not connected at the opposite ends thereof to the hydraulic actuators—is provided, and this control valve block is mounted as a whole on the body of the construction machine. It is, therefore, possible to efficiently perform the mounting work of the one control valve unit on the body.

In the above-described invention, the construction machine may be a compact excavator, the body may comprise a travel base and an upperstructure mounted on the travel base and having an operator's cab, the control valve block may be arranged underneath the operator's cab, and the mount parts of the bracket may be fixed on a swing frame of the upperstructure.

The present invention constructed as described above is particularly suited for compact excavators, which are prone to restrictions as to an increase in the number of kinds of parts or components and are also liable to restrictions as to the installation area of a control valve unit.

Advantageous Effects of the Invention

According to the present invention, the small first control valve unit and large second control valve unit can each be mounted on the same bracket. When selectively mounting the small first control valve unit and large second control valve unit on the bodies of construction machines of different models in the same family, it is, therefore, possible to use common brackets for mounting both the first control valve unit and the second control valve unit. Accordingly, no increase is incurred in the number of kinds of parts or components with respect to the brackets. In the present invention, the bracket has the pair of hanging-member fixing portions. The barycentric position of the bracket with the small first control valve unit mounted thereon and the barycentric position of the bracket with the second control valve unit mounted thereon are located on the imaginary line that connects the paired hanging-member fixing portions with each other. It is, therefore, possible to use common hanging members for hanging up and down the bracket with the small first control valve unit mounted thereon and the bracket with the second control valve unit mounted thereon. Accordingly, no increase is incurred either in the number of kinds of parts or components with respect to the hanging members.

The present invention, therefore, makes it possible to selectively mount a small first control valve unit or a large second control valve unit on the body of each of construction machines of different models in the same family without incurring an increase in the number of kinds of parts or components. When the manufacture of construction machines of different models in the same family is taken into consideration, the present invention can, therefore, cut down the manufacturing cost and also improve the efficiency of the mounting work of a control valve unit, both compared with the conventional technology.

BRIEF DESCRIPTION OF THE DRAWINGS

FIGS. 5A and 5B illustrate the construction of essential parts of the embodiment, in which FIG. 5A is a plan view illustrating a bracket with a first control valve unit of a small arrangement pitch mounted thereon and FIG. 5B is a plan view illustrating the bracket with a second control valve unit of a large arrangement pitch mounted thereon.

FIGS. 6A to 6C depict the bracket arranged in the embodiment, in which FIG. 6A is a plan view, FIG. 6B is a side view, and FIG. 6C is a back side view.

FIGS. 7A and 7B show the control valve block constructed in the embodiment, in which FIG. 7A is a plan view and FIG. 7B is a perspective view.

MODES FOR CARRYING OUT THE INVENTION

A mount structure according to an embodiment of the present invention for a control valve unit on a construction machine will hereinafter be described with reference to the drawings.

Figure 1:
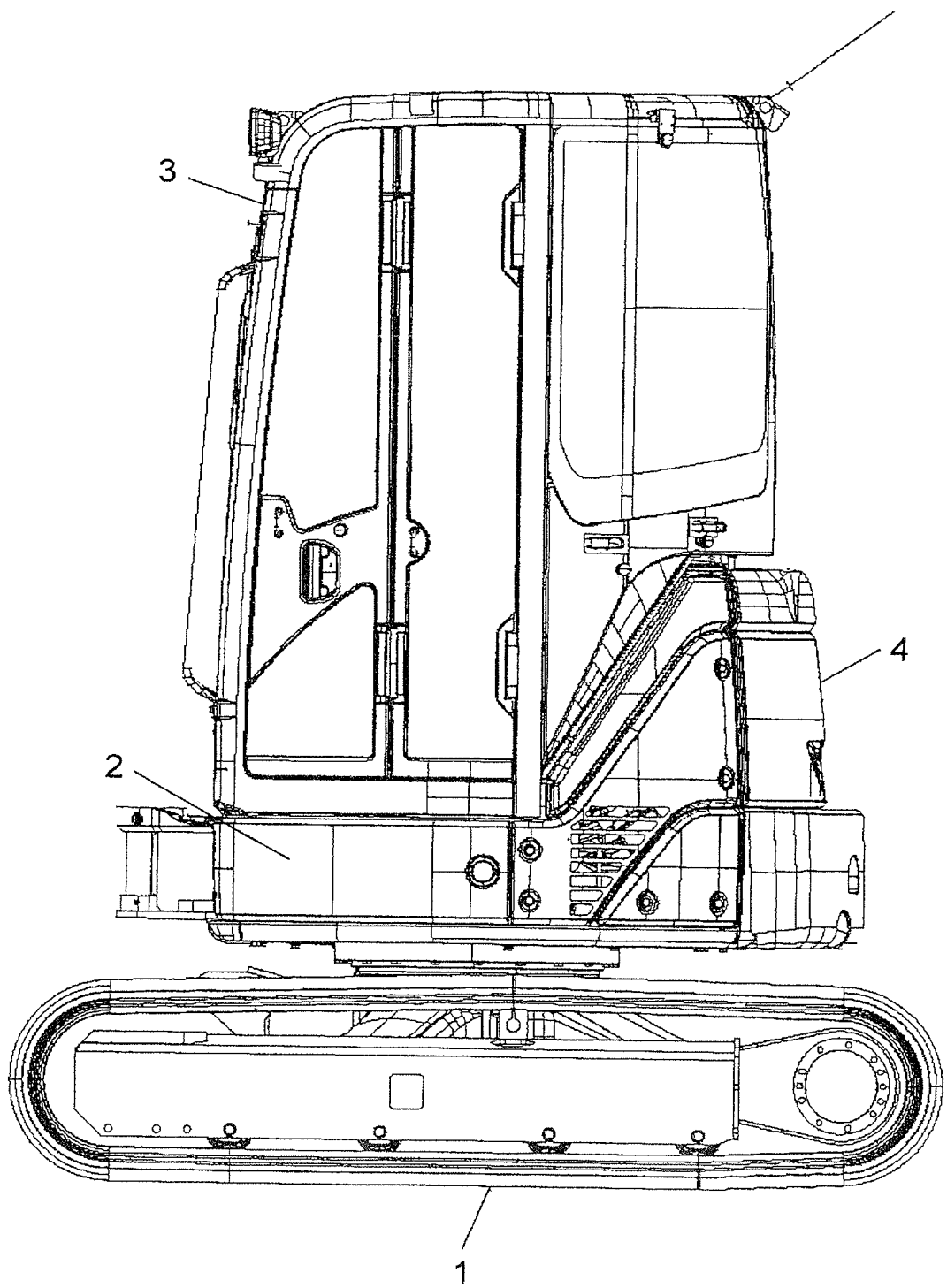
FIG. 1 is a side view of essential parts of a compact excavator exemplified as a construction machine on which a mount structure according to an embodiment of the present invention for a control valve unit can be arranged.
Figure 2:
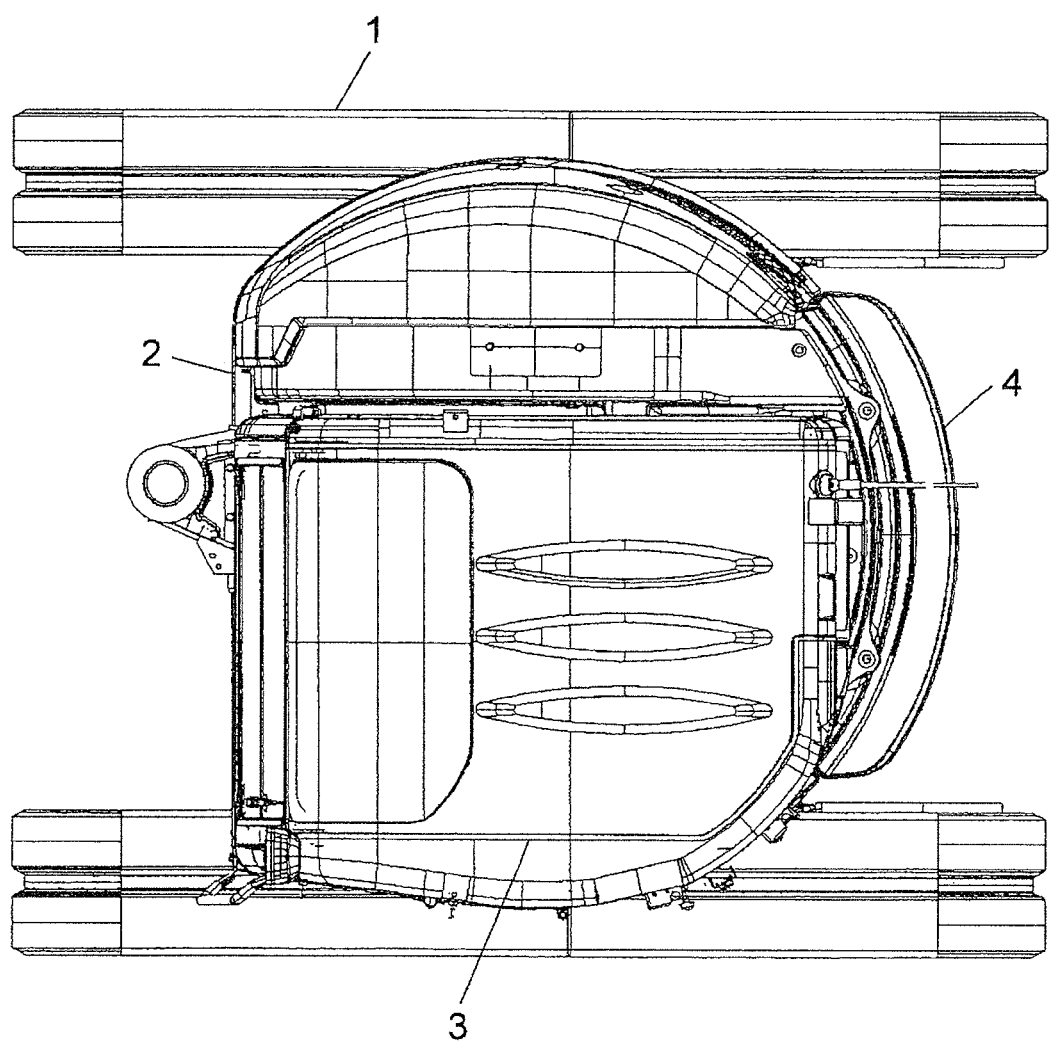
FIG. 2 is a plan view of the essential parts of the compact excavator shown in FIG. 1.

FIG. 1 is a side view of essential parts of a compact excavator exemplified as the construction machine on which the mount structure according to the embodiment of the present invention for the control valve unit can be arranged, and FIG. 2 is a plan view of the essential parts of the compact excavator shown in FIG. 1.

The construction machine on which the mount structure according to the embodiment of the present invention for the control valve unit can be used is, for example, a compact excavator, which is a construction machine prone to restrictions as to an increase in the number of kinds of parts or components and also liable to restrictions as to the installation area of the control valve unit.

As shown in FIGS. 1 and 2, this compact excavator is provided with a travel base 1 and an upperstructure 2 mounted on the travel base 1, and a body is made up with these travel base 1 and upperstructure 2. The upperstructure 2 is provided with unillustrated working equipment that includes a boom, arm, bucket and the like. This unillustrated working equipment also includes hydraulic actuators such as a boom cylinder, arm cylinder and bucket cylinder. It is to be noted that the travel base 1 and upperstructure 2 are also driven by hydraulic actuators comprised of a travel motor and swing motor, respectively. On the travel base 1, an operator's cab 3 is arranged, and at a position rear of the operator's cab 3, a counterweight 4 is arranged to assure a weight balance.

Figure 3:
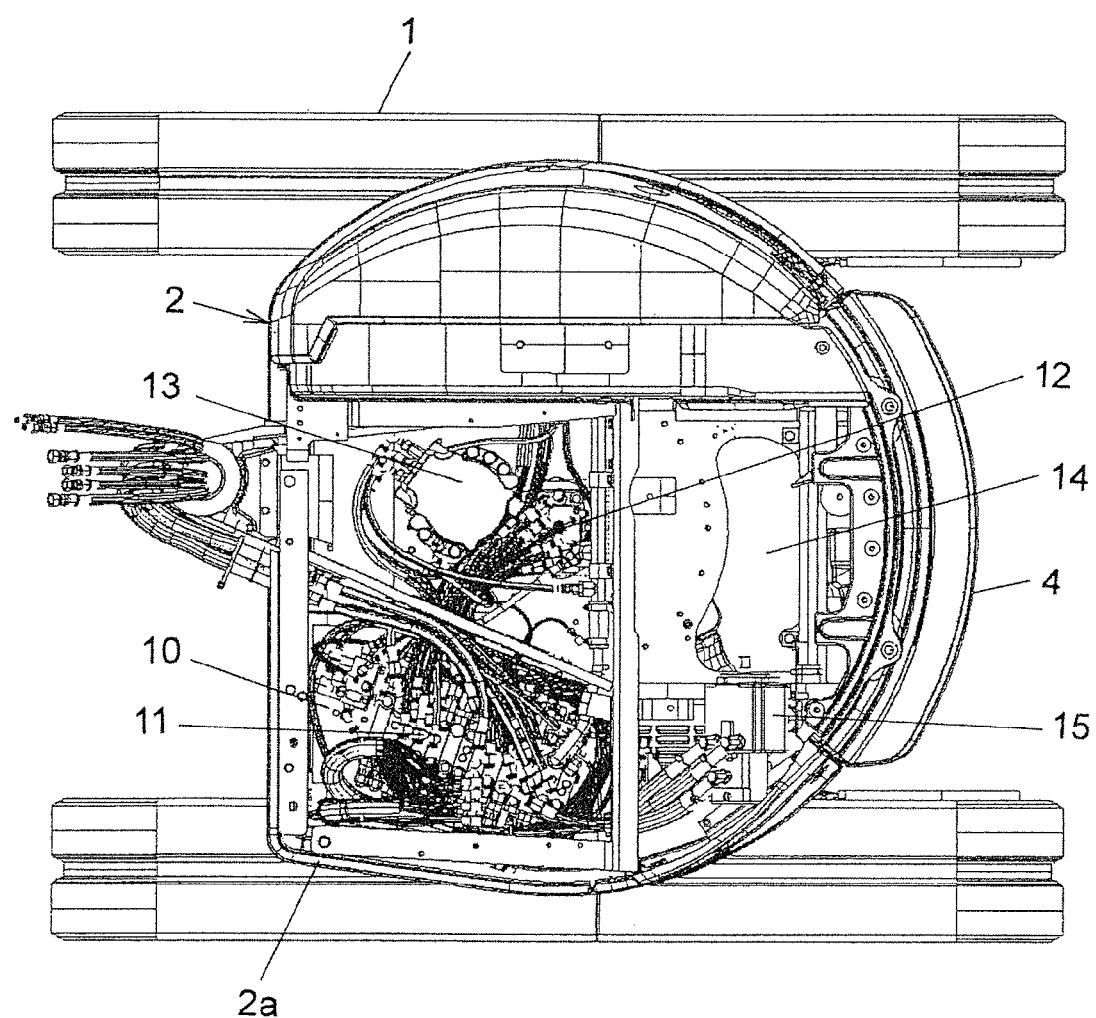
FIG. 3 is a plan view showing a layout on a swing frame with an operator's cab removed from the compact excavator shown in FIG. 1.
Figure 4:
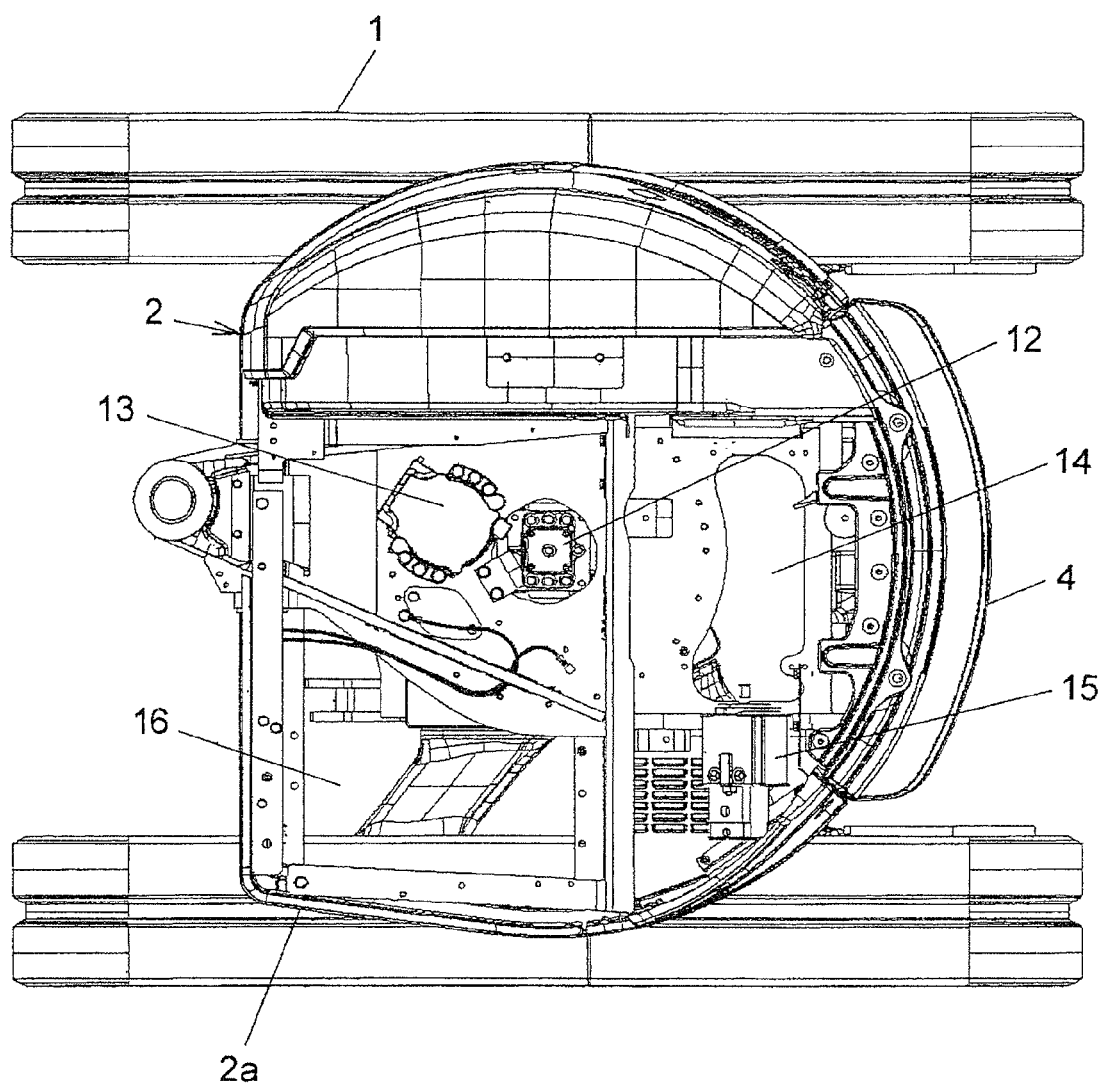
FIG. 4 is a plan view showing a layout on the swing frame before a control valve block formed in the embodiment is mounted.

FIG. 3 is a plan view showing a layout on a swing frame with the operator's cab removed from the compact excavator shown in FIG. 1, and FIG. 4 is a plan view showing a layout on the swing frame before a control valve block formed in the embodiment is mounted.

In a mount space 16 shown in FIG. 4 and formed, for example, at a position underneath the operator's cab 3, a control valve unit 11 which is comprised of plural directional control valves arranged side by side for controlling the above-mentioned individual hydraulic actuators is arranged as shown in FIG. 3. Further, a bracket 10 with the control valve unit 11 mounted thereon is fixed on a swing frame 2a of the upperstructure 2.

It is to be noted that as shown in FIGS. 3 and 4, a center joint 12 is arranged at a central position of the upperstructure 2 of the compact excavator and a swing motor 13 is arranged on a side forward of the center joint 12 to drive the upperstructure 2. Arranged in an engine compartment on a side rear of the center joint 12 are an engine 14, and a hydraulic pump 15 driven by the engine 14 to feed pressure oil to the above-mentioned individual hydraulic actuators via the control valve unit 11.

On the mount structure according to this embodiment, a relatively small first control valve unit 11A is arranged as the control valve unit 11 when an engine 14 of normal power output is installed as will be described subsequently herein, but a large control valve unit 11B compared with the first control valve unit 11A is installed in view of the pressure loss or reduction in a piping system as mentioned above when an engine 14 of power output with energy saving taken into consideration is installed but an equal pump output as the pump output available in the case of the engine 14 of normal power output is desired.

Figure 5A:
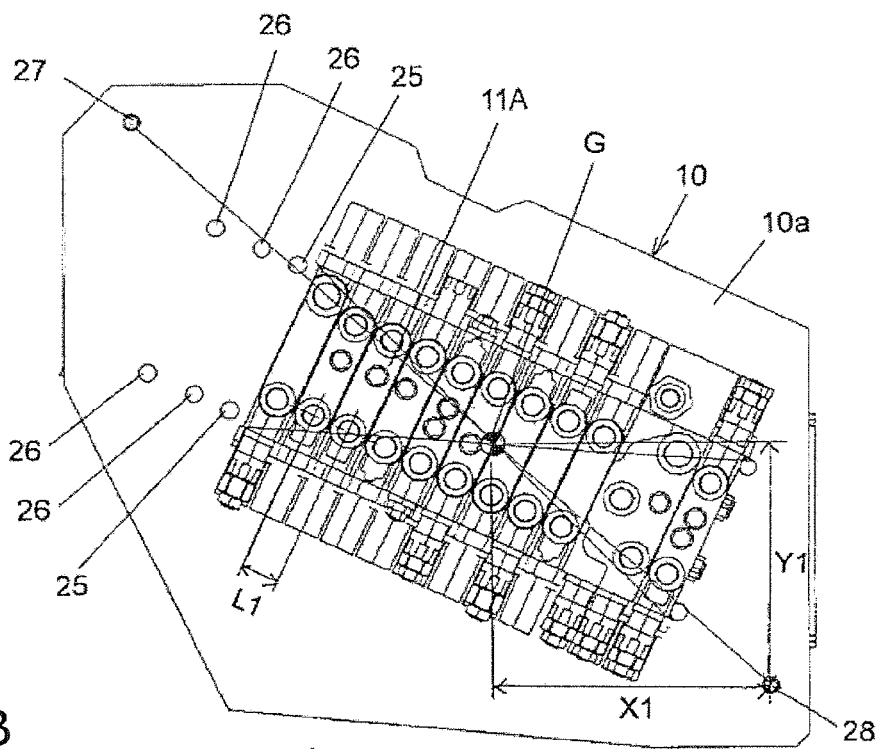
Figure 5B:
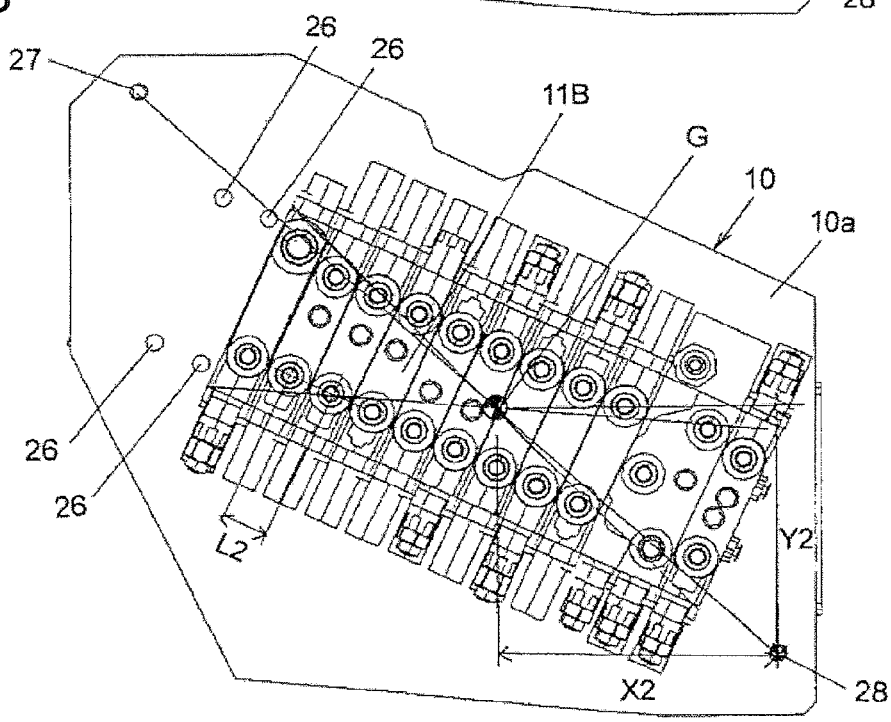

FIGS. 5A and 5B illustrate the construction of essential parts of the embodiment, in which FIG. 5A is a plan view illustrating a bracket with the first control valve unit of a small arrangement pitch mounted thereon and FIG. 5B is a plan view illustrating the bracket with the second control valve unit of a large arrangement pitch mounted thereon, and FIGS. 6A to 6C depict the bracket arranged in the embodiment, in which FIG. 6A is a plan view, FIG. 6B is a side view, and FIG. 6C is a back side view.

As illustrated in FIGS. 5A and 5B, an arrangement pitch L2 of plural directional control valves included in the above-mentioned second control valve unit 11B is greater than an arrangement pitch L1 of plural directional control valves included in the above-mentioned first control valve unit 11A, and accordingly, the second control valve unit 11B is formed larger than the first control valve unit 11A.

The bracket 10 for these first control valve unit 11A and second control valve unit 11B can mount both of the first control valve unit 11A and second control valve unit 11b as illustrated in FIGS. 5A and 5B, but only one of the first control valve unit 11A and second control valve unit 11B is mounted.

As also illustrated in FIGS. 5A and 5B, the bracket 10 is provided with a pair of hanging-member fixing portions at which hanging members for hanging up and down the bracket 10 are fixed. Of these paired hanging-member fixing portions, the first hanging-member fixing portion is comprised of a bolt hole 27 formed through the bracket 10 as depicted in FIG. 6A and a nut 27a welded and fixed on a rear side of the bracket 10 and located in registration with the bolt hole 27 as depicted in FIG. 6C, and an unillustrated first hanging bolt as a first hanging member is to be inserted in the bolt hole 27 and is to be brought into threaded engagement with the nut 27a. Similarly, the second hanging-member fixing portion is also comprised of a bolt hole 28 formed through the bracket 10 as depicted in FIG. 6A and a nut 28a welded and fixed on the rear side of the bracket 10 and located in registration with the bolt hole 28 as depicted in FIG. 6C, and an unillustrated second hanging bolt as a second hanging member is to be inserted in the bolt hole 28 and is to be brought into threaded engagement with the nut 28a.

As also illustrated in FIGS. 5A and 5B, upon mounting the first control valve unit 11A or second control valve unit 11B on the bracket 10, desired one of the first control valve unit 11A and second control valve unit 11B is mounted on the bracket 10 such that a barycentric position G of the bracket 10 with the first control valve unit 11A mounted thereon and a barycentric position G of the bracket 10 with the second control valve unit 113 mounted thereon are located on an imaginary line that connects the above-mentioned, paired hanging-member fixing portions with each other, for example, such that the barycentric position G of the bracket 10 with the first control valve unit 11A mounted thereon and the barycentric position G of the bracket 10 with the second control valve unit 113 mounted thereon are located on the imaginary line connecting the paired hanging-member fixing portions with each other, and coincide with each other.

As illustrated in FIGS. 5A and 5B, the barycentric position G of the bracket 10 with the first control valve unit 11A mounted thereon is set, for example, at a position apart from the bolt hole 28 as a base point by a lateral dimension X1 and a longitudinal dimension Y1. On the other hand, the barycentric position G of the bracket 10 with the second control valve unit 11B mounted thereon is set, for example, at a position apart from the bolt hole 28 as a base point by a lateral dimension X2 and a longitudinal dimension Y2. By setting X1=X2 and Y1=Y2, the barycentric position G of the bracket 10 with the first control valve unit 11A mounted thereon and the barycentric position G of the bracket 10 with the second control valve unit 113 mounted thereon can now be brought into coincidence as mentioned above.

As depicted in FIGS. 6A to 6C, the bracket 10 has a flat plate part 10a, and a first mount part 10b and second mount part 10c, which are formed extending from the flat plate part 10a and are to be fixed on the swing frame 2a. Formed through the flat plate part 10a of the bracket 10 are four bolt holes 24, four bolt holes 25 formed outward of the four bolt holes 24, respectively, four bolt holes 26, and the two bolt holes 27,28 that make up the above-mentioned hanging-member fixing portions. In the four bolt holes 24, bolts (bolts 29 in FIG. 8) are to be inserted for mounting the first control valve unit 11A. In the four bolt holes 25, unillustrated bolts are to be inserted for mounting the second control valve unit 11B. The four bolts 26 are to be used upon mounting an optional actuator or the like.

Formed through the first mount part 10b of the bracket 10 are two bolt holes 10b1 in which bolts (bolts 22 in FIG. 8) are to be inserted, respectively, for fixing the bracket 10 on the swing frame 2a. Formed through the second mount part 10c of the bracket 10 are two bolt holes 10c1 in which bolts (bolts 23 in FIG. 8) are to be inserted, respectively, for fixing the bracket 10 on the swing frame 2a. As depicted in FIG. 6B, two nuts 10b2 with which the above-mentioned bolts 22 shown in FIG. 8 are to be brought into threaded engagement, respectively, are welded and fixed on an upper surface of the first mount part 10b at positions in registration with the bolt holes 10b1, and two nuts 10c2 with which the above-mentioned bolts 23 shown in FIG. 8 are to be brought into threaded engagement, respectively, are welded and fixed on an upper surface of the second mount part 10c at positions in registration with the bolt holes 10c1.

Figure 7A:
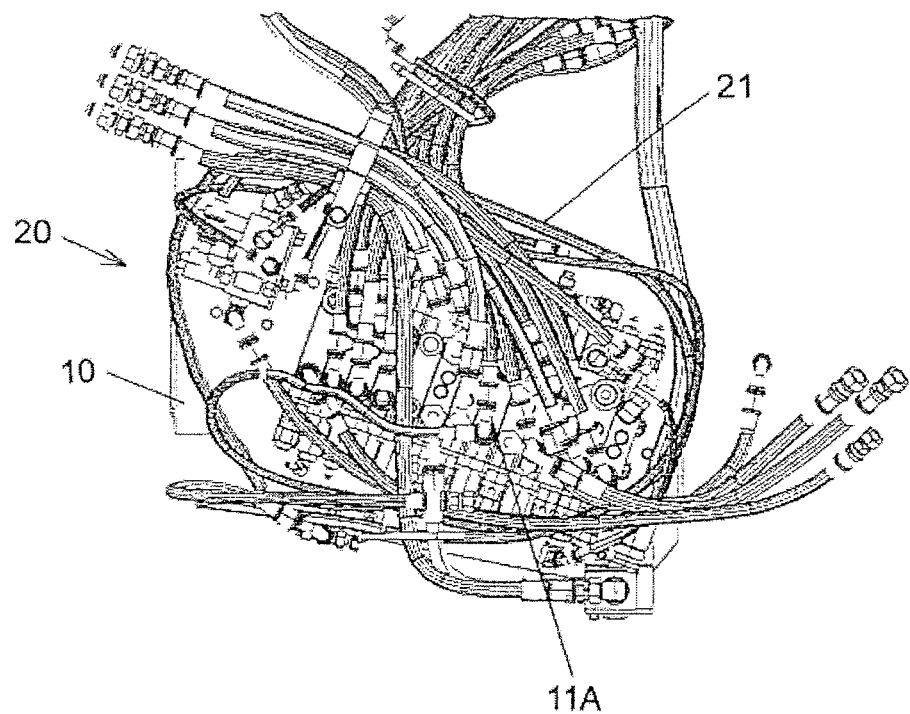
Figure 7B:
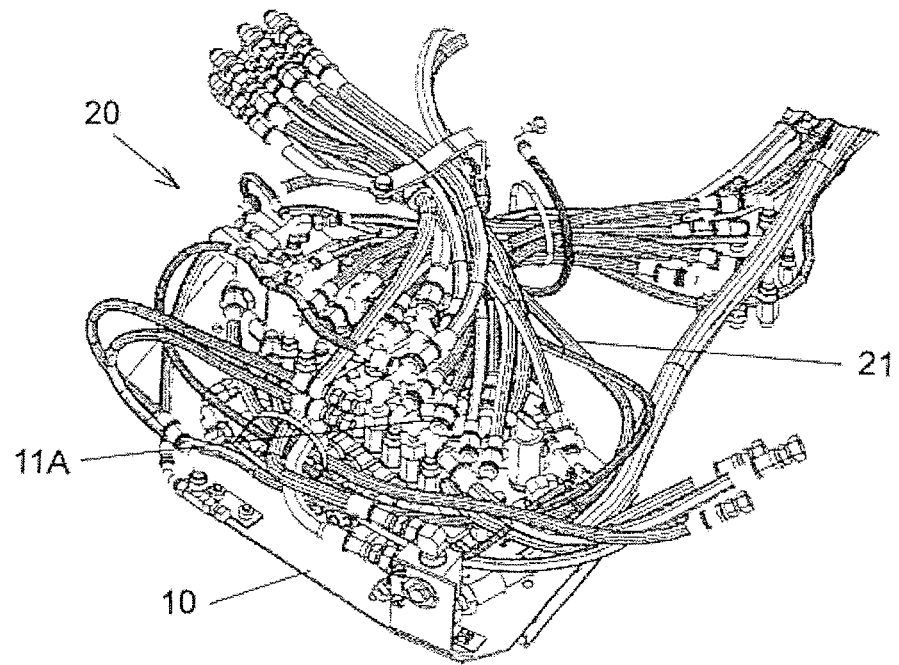
Figure 8:
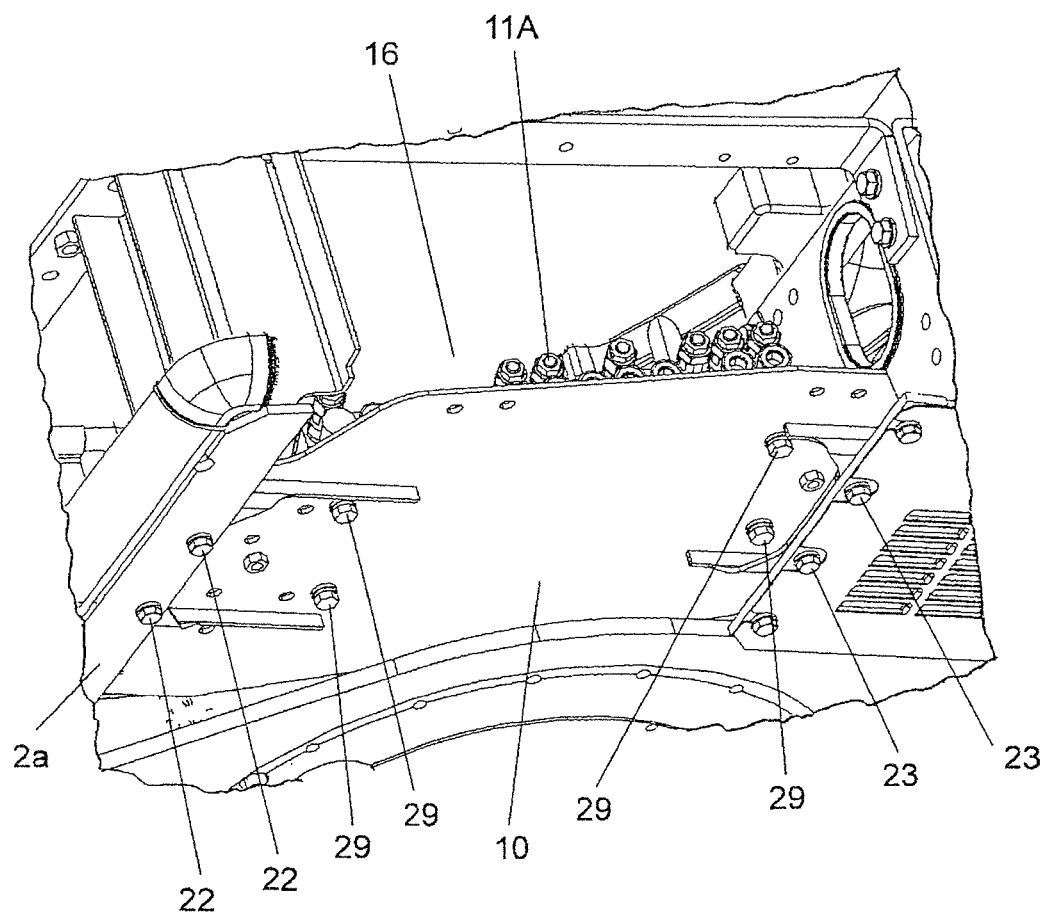
FIG. 8 is a perspective view of the embodiment as seen from obliquely below.

FIGS. 7A and 7B show the control valve block constructed in the embodiment, in which FIG. 7A is a plan view and FIG. 7B is a perspective view, and FIG. 8 is a perspective view of the embodiment as seen from obliquely below.

This embodiment is further provided with hydraulic hoses 21 and a control valve block 20. The hydraulic hoses 21 are used to connect desired one of the first control valve unit 11A and second control valve unit 11B, for example, the first control valve unit 11A as shown in FIGS. 7A and 7B and the above-mentioned hydraulic actuators with each other. The control valve block 20 is fabricated before the bracket 10 is fixed on the swing frame 2a, and integrally includes the bracket 10, the illustrative, first control valve unit 11A mounted on the bracket 10, and the hydraulic hoses 21 connected at one ends thereof to the first control valve unit 11A and not connected at opposite ends thereof to the hydraulic actuators. Upon mounting the first control valve unit 11A on the upperstructure 2, this control valve 20 is accommodated as a whole in the mount space 16 shown in FIG. 8, and the first mount part 10b and second mount part 10c of the bracket 10 included in the control valve block 20 are fixed on the swing frame 2a by the bolts 22 and 23, respectively. It is to be noted that a similar control valve block as mentioned above is also fabricated beforehand upon mounting the second control valve unit 11B on the swing frame 2a.

According to this embodiment constructed as described above, the small first control valve unit 11A and the large second control valve unit 11B, which are alternatively selected depending on whether the engine power output is large or small, can each be mounted on the bracket 10. When the manufacture of different construction machines, or in this embodiment, compact excavators of different models in the same family is taken into consideration, it is, therefore, possible to realize the use of common brackets 10 for mounting both the first control valve unit 11A and the second control valve unit 11B. Accordingly, the use of these common brackets 10 can selectively mount the first control valve unit 11A or the second control valve unit 11B on the body, specifically the swing frame 2a of the upperstructure 2 of each of the compact excavators of the same family without incurring an increase in the number of kinds of parts or components.

In this embodiment, the barycentric position G of the bracket 10 with the small first control valve unit 11A mounted thereon and the barycentric position G of the bracket 10 with the large second control valve unit 11B mounted thereon are located on the imaginary line that connects the paired hanging-member fixing portions with which the bracket 10 is provided. When the manufacture of compact excavators of different models in the same family is taken into consideration, it is, therefore, possible to realize the use of common hanging members, specifically hanging bolts for hanging up and down the brackets with the control valve units mounted thereon. Accordingly, the use of these common hanging bolts can selectively mount the first control valve unit 11A or the second control valve unit 11B on each of the compact excavators without incurring an increase in the number of kinds of parts or components.

In other words, this embodiment can selectively mount the small first control valve unit 11A or the large second control valve unit 11B on the swing frame 2a of the upperstructure 2 of each of the compact excavators of different models in the same family without incurring an increase in the number of kinds of parts or components. When the manufacture of compact excavators which belong to the same family but differ in the size of the control valve unit is taken into consideration, it is, therefore, possible to cut down the manufacturing cost and also to improve the efficiency of the mounting work of control valve units.

According to this embodiment, the bracket 10 with the first control valve unit 11A mounted thereon and the bracket 10 with the second control valve unit 11B mounted thereon can each be stably hung up and down by inserting and bringing unillustrated hanging bolts into threaded engagement with the bolt hole 27 and nuts 27a and the bolt hole 28 and nut 28a, respectively, which are arranged on the imaginary line passing through the barycentric position G with the barycentric position G being located therebetween. This embodiment, therefore, contributes to an improvement in the efficiency of the mounting work of control valve units.

According to this embodiment, upon mounting either the first control valve unit 11A or the second control valve unit 11B on the bracket 10, the relevant control valve unit can be firmly fixed on the bracket 10 by inserting the bolts in the four bolt holes 24 or four bolt holes 25 arranged through the flat plate part 10a of the bracket 10. By inserting the bolts 22 into threaded engagement with the two bolt holes 10b1 and nuts 10b2 with which the first mount part 10b formed extending from the flat plate part 10a is provided and also inserting the bolts 23 into threaded engagement with the two bolt holes 10c1 and nuts 10c2 with which the second mount part 10c is provided, these first and second mount parts 10b, 10c, in other words, the bracket 10 can be firmly fixed on the swing frame 2a of the upperstructure 2. Upon mounting the first control valve unit 11A on the swing frame 2a of the upperstructure 2 and also upon mounting the second control valve unit 11B on the swing frame 2a of the upperstructure 2, this embodiment can, therefore, stably mount each of the control valve units on the upperstructure 2.

In this embodiment, the control valve block 20—which integrally includes the prefabricated bracket 10, desired one of the first control valve unit 11A and second control valve unit 11B, and the hydraulic hoses 21 connected at the one ends thereof to the desired one control valve unit and not connected at the opposite ends thereof to the hydraulic actuators—is provided, and this control valve block 20 is mounted as a whole on the upperstructure 2 of the compact excavator. It is, therefore, possible to efficiently perform the mounting work of the desired one control valve unit on the upperstructure 2.

In the embodiment constructed as described above, upon mounting the first control valve unit 11A or second control valve unit 11B on the bracket 10, the first control valve unit 11A or second control valve unit 11B is mounted on the bracket 10 such that the barycentric position G of the bracket 10 with the first control valve unit 11A mounted thereon and the barycentric position G of the bracket 10 with the second control valve unit 11B mounted thereon are located on the imaginary line connecting the paired hanging-member fixing portions with each other, and coincide with each other. However, the present invention shall not be limited to such a construction. Desired one of the first control valve unit 11A and second control valve unit 11B may be mounted on the bracket 10 such that the barycentric position G of the bracket 10 with the first control valve unit 11A mounted thereon and the barycentric position G of the bracket 10 with the second control valve unit 11B mounted thereon are located on the imaginary line connecting the paired hanging-member fixing portions with each other but differ from each other.

LEGEND

1 Travel base
2 Upperstructure
2a Swing frame
3 Operator's cab
10 Bracket
10a Flat plate part
10b First mount part
10b1 Bolt hole
10c Second mount part
10c1 Bolt hole
11 Control valve unit
11A First control valve unit
11B Second control valve unit
13 Swing motor
14 Engine
15 Hydraulic pump
16 Mount space
20 Control valve block
21 Hydraulic hose
22 Bolt
23 Bolt
24 Bolt hole
25 Bolt hole
27 Bolt hole (first hanging-member fixing portion)
27a Nut (first hanging-member fixing portion)
28 Bolt hole (second hanging-member fixing portion)
28a Nut (second hanging-member fixing portion)
29 Bolt
L1 Arrangement pitch
L2 Arrangement pitch
G Barycentric position

The invention claimed is:

1. A mount structure for a control valve unit on a construction machine having working equipment, a body with the working equipment attached thereto, a hydraulic actuator for driving the working equipment and a hydraulic actuator for driving the body, and the control valve unit comprised of plural directional control valves arranged side by side for controlling the hydraulic actuators, respectively,
said mount structure having a bracket for mounting the control valve unit thereon and being to be fixed on the body, wherein:
the control valve unit comprises a first control valve unit, and a second control valve unit having plural directional control valves set at a greater arrangement pitch than an arrangement pitch of plural directional control valves included in the first control valve unit and formed larger than the first control valve unit,
the bracket has a pair of hanging-member fixing portions and is used to mount thereon only one of the first control valve unit and second control valve unit although the first control valve unit and the second control valve unit can each be mounted on the bracket, and
upon mounting the one of the first control valve unit and second control valve unit on the bracket, the one of the first control valve unit and second control valve unit is mounted on the bracket such that a barycentric position of the bracket with the first control valve unit mounted thereon and a barycentric position of the bracket with the second control valve unit mounted thereon are located on an imaginary line that connects the paired hanging-member fixing portions with each other.

2. The mount structure according to claim 1, wherein:
the one of the first control valve unit and second control valve unit is mounted on the bracket such that the barycentric position of the bracket with the first control valve unit mounted thereon and the barycentric position of the bracket with the second control valve unit mounted thereon coincide with each other.

3. The mount structure according to claim 2, wherein:
the bracket is provided with a flat plate part having bolt holes in which bolts for mounting the first control valve unit are to be inserted and bolt holes in which bolts for mounting the second control valve unit are to be inserted, and also with mount parts formed extending from the flat plate part and having bolt holes in which bolts for fixing the bracket on the body are to be inserted.

4. The mount structure according to claim 3, wherein:
the mount structure is further provided with:
hydraulic hoses for connecting the one of the first control valve unit and second control valve unit and the hydraulic actuators with each other, and also with:
a control valve block fabricated before the bracket is fixed on the body and integrally including the bracket, the one control valve unit mounted on the bracket, and the hydraulic hoses connected at one ends thereof to the one control valve unit and not connected at opposite ends thereof to the hydraulic actuators, and
the mount parts of the bracket included in the control valve block are to be fixed on the body.

5. The mount structure according to claim 1, wherein:
the construction machine is a compact excavator,
the body comprises a travel base and an upperstructure mounted on the travel base and having an operator's cab,
the control valve block is to be arranged underneath the operator's cab, and
the mount parts of the bracket are to be fixed on a swing frame of the upperstructure.

6. The mount structure according to claim 2, wherein:
the construction machine is a compact excavator,
the body comprises a travel base and an upperstructure mounted on the travel base and having an operator's cab,
the control valve block is to be arranged underneath the operator's cab, and
the mount parts of the bracket are to be fixed on a swing frame of the upperstructure.

7. The mount structure according to claim 3, wherein:
the construction machine is a compact excavator,
the body comprises a travel base and an upperstructure mounted on the travel base and having an operator's cab,
the control valve block is to be arranged underneath the operator's cab, and
the mount parts of the bracket are to be fixed on a swing frame of the upperstructure.

8. The mount structure according to claim 4, wherein:
the construction machine is a compact excavator,
the body comprises a travel base and an upperstructure mounted on the travel base and having an operator's cab,
the control valve block is to be arranged underneath the operator's cab, and
the mount parts of the bracket are to be fixed on a swing frame of the upperstructure.

* * * * *